United States Patent [19]

Gochis

[11] 4,162,491
[45] Jul. 24, 1979

[54] INDUCTIVE POSITION SENSOR WITH MINIMUM OUTPUT SIGNAL LEVEL CAPACITIVELY COUPLED TO INDICATE FAILURE OF DEVICE

[75] Inventor: George G. Gochis, Shelton, Conn.

[73] Assignee: Avco Corporation, Stratford, Conn.

[21] Appl. No.: 868,483

[22] Filed: Jan. 11, 1978

[51] Int. Cl.² ............................................. G08B 21/00
[52] U.S. Cl. ..................................... 340/646; 324/208; 324/55; 340/196; 340/654
[58] Field of Search .................... 324/207, 208, 51, 55; 340/646, 195, 199; 318/653, 656, 657, 658, 659, 660, 661

[56] References Cited
U.S. PATENT DOCUMENTS 2,650,352  8/1953  Childs ................................. 318/660
3,626,283  12/1971  James et al. .......................... 324/55
3,731,752  5/1973  Sched .................................. 324/247

Primary Examiner—Robert J. Corcoran
Assistant Examiner—Walter E. Snow
Attorney, Agent, or Firm—Ralph D. Gelling

[57] ABSTRACT

A primary and a secondary of an inductive position sensor are connected by a capacitively coupling means. An output of the position sensor is connected to a level detector functioning as a failure indicator. The capacitive coupling of the primary and secondary of the inductive position sensor results in the output of the position sensor being above a minimum signal level at every position including the position at which the sensor output indicates zero or null position. When the sensor output falls below the minimum signal level, the level detector indicates failure.

1 Claim, 2 Drawing Figures

INDUCTIVE POSITION SENSOR WITH MINIMUM OUTPUT SIGNAL LEVEL CAPACITIVELY COUPLED TO INDICATE FAILURE OF DEVICE

BACKGROUND OF THE INVENTION

1. Field of the Invention

The invention generally relates to position sensors. A position sensor usually has a zero signal output at the null or zero position which frequently occurs in the middle of its operating range. The disclosed invention specifically relates to an inductive position sensor with a level detector acting as a fault indicator which has the ability to monitor the signal output of the inductive position sensor at every position and to indicate failure when the signal output is below a given minimum signal level.

2. Description of the Prior Art

Many techniques have been developed to aid in determination of whether a position sensor is properly operating. Most of these techniques suffer from disadvantage in that they limit the use of the position sensor or otherwise restrict its field of operation. For example, inductive position sensors normally have a zero signal output in the middle of their operating range, usually the null or zero point. Failure may be detected if the operation is restricted to angles which are greater or less than zero and which will always produce some minimal signal output of the position sensor so that an output signal is always present for monitoring. If operation through the zero position is required, the normal signal at zero is zero and a failure is not distinguishable from normal operation.

U.S. Pat. No. 2,823,877, issued to Hess, is one such example of the prior art wherein it suggests the concept of utilizing the output of phase-sensitive demodulators to create an analog signal which is monitored to detect failure of a servo system. As noted above, this concept suffers from the problem that the zero position results in a zero signal output and failure is not distinguishable from normal operation at this point.

The utilization of an integrated circuit to provide a limited signal applied to a level detector which functions at a fault monitor when the signal rises above a preset limit is also known in the prior art as taught by U.S. Pat. No. 3,778,696 issued to R. G. Walters.

SUMMARY OF THE INVENTION

The invention disclosed includes a capacitive coupling means between the primary and secondary windings of an inductive position sensor. The purpose of the coupling is to provide a voltage level on the output resulting from the secondary winding of the position sensor. This voltage level is detected by a phase detector at all positions including the position at which the sensor goes through zero or null point and has a zero phase output. The phase detector does not respond to the capacitively coupled component of the voltage and the phase detector output indicating the position of the sensor remains unaffected. The capacitively coupled voltage level is detected by a level detector in the output circuit and thus provides a means to monitor the proper operation of the position sensor independent of the angle through which the sensor may be rotating.

It is an object of this invention to provide an inductive position sensor having a failure detector which allows operating and monitoring of the sensor through the null or zero position.

It is a further object of this invention to provide an inductive position sensor which has a signal output which continuously maintains a minimum signal level so that a failure detector such as a level detector can determine at any point, including the null or zero point, that the sensor fails to properly operate.

It is yet another object of the invention to provide an inductive position sensor having a capacitive coupling means connecting the primary and secondary of the sensor thereby providing a minimum signal level at all times at the output of the sensor.

BRIEF DESCRIPTION OF THE DRAWINGS

These and other features of the invention will become apparent to those skilled in the art by referring to the accompanying drawings in which.

DETAILED DESCRIPTION OF THE INVENTION

Figure 1:
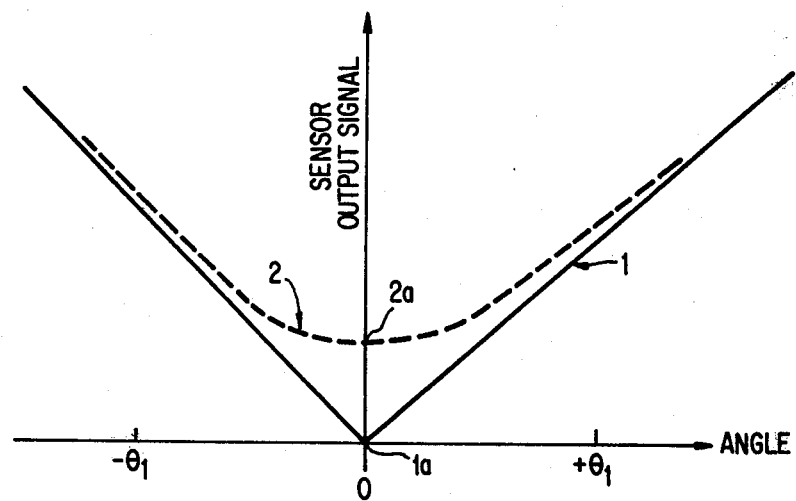
FIG. 1 is a graph of the sensor output signal as compared to the angle of the sensor.

Referring to FIG. 1, a graph is shown which plots the angle of the location of a position sensor in contrast to the sensor output signal. Output signal 1 refers to the prior art wherein the signal is directly proportional to the position sensor. As can be noted, when the position sensor indicates a zero angle, the sensor output signal also indicates zero as noted at point 1a. In order to provide proper failure detection in this situation, the angle of operation must be restricted to angles greater than $\pm \Theta$, a given angle above and below which a sensor output signal is always present. This results in a limited field of operation.

Figure 2:
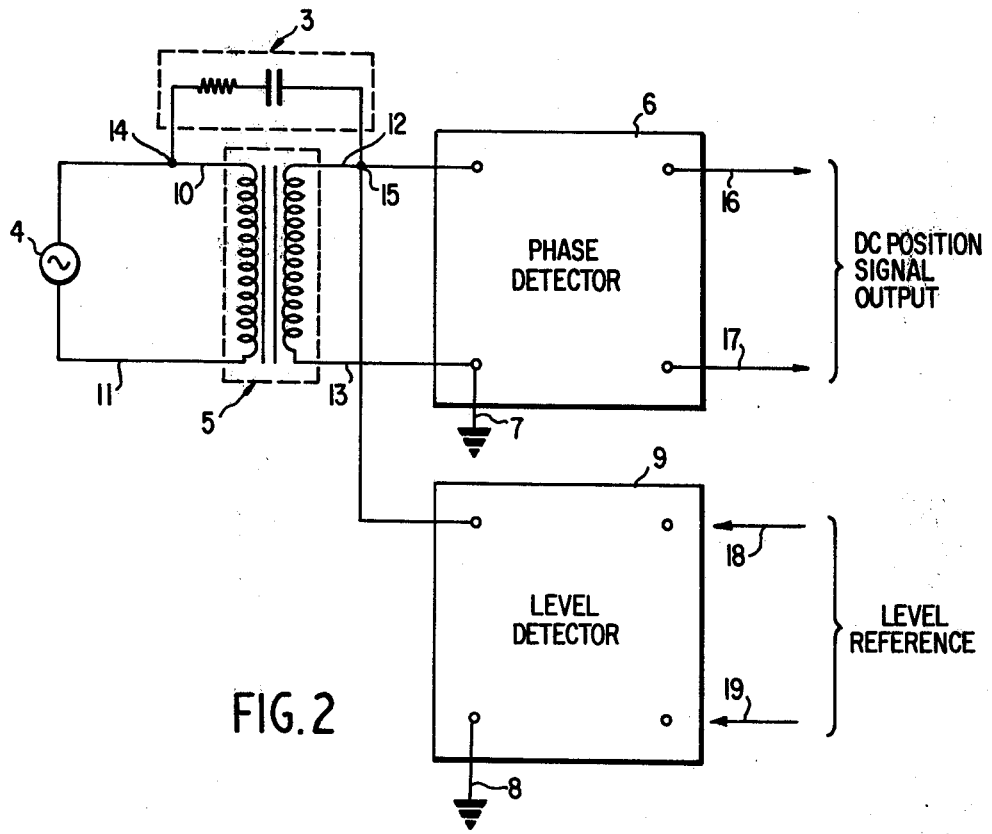
FIG. 2 is a block diagram of the inductive position sensor with failure detector.

FIG. 2 is a diagram of the preferred embodiment of the invention. Position sensor 5 can be any known position sensor including an inductive position sensor. For example, the sensor may be a rotary transformer having a stationary coil and a movable coil free to rotate which generates an AC voltage proportional to the angular position of the movable coil. The basic principle of operation is as follows: The stationary coil (primary) is supplied with an exciting current which generates a magnetic field. The movable coil (secondary) consists of two coils connected in series. In the null position, the voltage induced in the two coils of the secondary are equal and opposite resulting in no output voltage. As the movable coil is rotated with respect to the stationary coil, the coupling between the primary and one of the coils of the secondary is increased while the coupling between the primary and the other coil of the secondary is decreased. The net result is an output voltage proportional to anular position of the secondary with respect to the primary. At the null position, the output voltage is zero. The output voltage increases linearly with angular displacement of the secondary on either side of the null position. The movable coil is conventionally mounted on an object (not shown), the position of which is to be monitored. The stationary coil is mounted in a fixed position adjacent the movable coil.

The primary leads 10 and 11 of the position sensor 5 are connected to a source 4 which can be any conventional source required by the sensor such as an AC excitation source in the case of an inductive position sensor. As the position sensor is moved as a result of the movement of the object to which it is attached, the secondaries 12 and 13 of the position sensor provide a sensor signal output which corresponds to the sensor position. Phase detector 6 receives the signal from the secondaries 12 and 13 and converts it to a DC position signal at its outputs 16 and 17. The secondary 13 of the position sensor 5 which is connected to the phase detector 6 is also connected to a ground means 7.

In order to provide a minimum signal level at all times at the secondary 12 of the position sensor 5, a capacitive coupling means 3 is connected to the primary 10 of the position sensor at point 14 and to the secondary 12 of the position sensor at point 15, a second input of the level detector being connected to a ground means 8. The capacitive coupling means 3 can be any conventional means such as a plate capacitor, ceramic capacitor or condensor and may or may not have a resistor connected in series to it.

The result of this capacitive coupling means 3 is to provide a minimum signal level at all times at the secondary 12 which is the output of the position sensor 5. This minimum signal level must be provided if the sensor is functioning properly. As noted in FIG. 1, the output signal with capacitive coupling 2 always has a value which is greater than or equal to the signal at the zero point 2a. This is because the effect of the capacitive coupling between the primary 10 and the secondary 12 of the position sensor 5 is to create a minimum signal 2a, the magnitude of the signal being dependent upon the type and magnitude of capacitive coupling 3. This minimum signal level allows a level detector 9 to monitor the secondary 12. The level detector may be any means which will indicate when a signal is below a reference signal. Depending on the type and magnitude of capacitive coupling, a reference level is connected to terminals 18 and 19 of the level detector 9. This reference level is equivalent to minimum signal 2a and is compared by the level detector 9 to the output of the secondary which the level detector 9 receives from point 15. This results in the ability of the level to continuously monitor at all positions the output of the position sensor 5. When the level of the output of the secondary 12 is below the reference level, the level detector 9 will indicate that the sensor 5 has failed. Contrary to the prior art, this monitoring occurs at all times during the operation of the position sensor including the null or zero point or the point in the middle of the operating range as shown in FIG. 1. Independently, the phase detector 6 does not respond to the capacitively coupled component of voltage provided by the capacitive means 3 and the normal signal output 16 and 17 of the phase detector remains unaffected.

One application for the apparatus is to sense the position of an output shaft of an electro-mechanical actuator used in a gas turbine engine speed governor. The electro-mechanical actuator is operated by an electronic control which senses speed and supplies a corrective signal to the motor when required. The actuator is mechanically coupled to a throttle linkage so that it can govern without interfering with an operator's control.

Furthermore, although the present invention has been disclosed and discussed with particular regard to its exceptional advantages in terms of inductive position sensors, it may be understood that the invention may be employed in several industrial applications wherein sensor monitor is required and capacitive or other coupling can be employed.

Various changes may be made in the details of this invention as disclosed without sacrificing the advantages thereof or departing from the scope of the appending claims.

What is claimed is:

1. Apparatus for indicating the angular position of one object with respect to another comprising:
   a source of power;
   an inductive position sensor having a primary coil connected to the source of power and a secondary coil, said secondary coil magnetically coupled to the primary coil and mounted for movement relative thereto in a manner which varies the magnetic coupling as relative movement occurs thereby producing an output signal on the secondary coil proportional to said relative movement, said inductive position sensor having a point of zero output in the middle of its range of positions;
   a coupling capacitor connected from the primary coil to the secondary coil to impress a minimum signal level at the output of the secondary coil;
   a phase detector connected to receive the output signal of the inductive position sensor and to generate a D.C. signal proportional to the output signal of the position sensor, but independent of the minimum signal level; and
   a level detector connected to the output of the position sensor to receive the minimum signal level, to compare said minimum signal level to a predetermined reference level, and to generate an alarm signal in response to changes in the minimum signal level.

* * * * *